(12) United States Patent
Tang et al.

(10) Patent No.: US 6,178,328 B1
(45) Date of Patent: Jan. 23, 2001

(54) METHOD AND SYSTEM FOR SOLVING CELLULAR COMMUNICATIONS FREQUENCY PLANNING PROBLEM

(75) Inventors: Yuqiang Tang, Plano; Roderick Djurkovic, Allen, both of TX (US)

(73) Assignee: Nortel Networks Corporation, Montreal (CA)

( * ) Notice: Under 35 U.S.C. 154(b), the term of this patent shall be extended for 0 days.

(21) Appl. No.: 09/096,426

(22) Filed: Jun. 11, 1998

(51) Int. Cl.$^7$ .................................................. H04B 1/00
(52) U.S. Cl. ............................................ 455/447; 455/446
(58) Field of Search .................................. 455/446, 447, 455/450, 449

(56) References Cited

U.S. PATENT DOCUMENTS

| | | | |
|---|---|---|---|
| 5,081,671 | * | 1/1992 | Raith et al. ............................ 379/452 |
| 5,247,699 | | 9/1993 | Hartman ............................... 455/33.1 |
| 5,734,983 | * | 3/1998 | Faruque ................................ 455/450 |
| 5,774,790 | * | 6/1998 | Dupuy .................................. 455/466 |

FOREIGN PATENT DOCUMENTS

| | | | |
|---|---|---|---|
| 0470831 A2 | 8/1991 | (EP) ................................ H04Q/7/04 |
| 2308276A | 6/1997 | (GB) ................................ H04Q/7/36 |

OTHER PUBLICATIONS

"N =4 Tri–Cellular Plan With Alternate Channel Assignment", Saleh Farugue, 1995 IEEE, pp. 1244–1247.
"The N=9 Frequency Plan: A Modified Technique to Enhance C/I Performance and Capacity", Saleh Faruque, 1993, pp. 718–722.
"Regular Cellular Reuse Patterns", Michel Mouly, 1991 IEEE, pp. 681–688.

* cited by examiner

Primary Examiner—Reinhard J. Eisenzopf
Assistant Examiner—Makoto Aoki
(74) Attorney, Agent, or Firm—John D. Crane; Felsman, Bradley, Vaden, Gunter & Dillon, LLP

(57) ABSTRACT

A method and system for use with wireless communications systems having a plurality of groups of channels, and wherein the method and system assign specific groups of channels such that channel interference is minimized. The method and system accomplish their objects via the use of communications equipment adapted to do the following: define a geographic area; map the defined geographic area with at least one high bandwidth cell cluster wherein each cell has at least one sector; and eliminate channel adjacencies by selectively assigning channels, drawn from the plurality of groups of channels, to the at least one high bandwidth cell cluster. The method and system further accomplish their objects via the use of communications equipment adapted to do the following: select a frequency reuse table having a predefined frequency reuse factor; and define a high bandwidth cell cluster over which the frequency reuse table is utilized such that the defined frequency reuse factor is effectively maintained while the communications efficiency of a wireless communications system is enhanced.

19 Claims, 12 Drawing Sheets

Cell Cluster of Size 7 Wherein No Frequencies Are Reused

| Channel group | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 |
| | 22 | 23 | 24 | 25 | 26 | 27 | 28 | 29 | 30 | 31 | 32 | 33 | 34 | 35 | 36 | 37 | 38 | 39 | 40 | 41 | 42 |
| | 43 | 44 | 45 | 46 | 47 | 48 | 49 | 50 | 51 | 52 | 53 | 54 | 55 | 56 | 57 | 58 | 59 | 60 | 61 | 62 | 63 |
| | 64 | 65 | 66 | 67 | 68 | 69 | 70 | 71 | 72 | 73 | 74 | 75 | 76 | 77 | 78 | 79 | 80 | 81 | 82 | 83 | 84 |
| | 85 | 86 | 87 | 88 | 89 | 90 | 91 | 92 | 93 | 94 | 95 | 96 | 97 | 98 | 99 | 100 | 101 | 102 | 103 | 104 | 105 |
| | 106 | 107 | 108 | 109 | 110 | 111 | 112 | 113 | 114 | 115 | 116 | 117 | 118 | 119 | 120 | 121 | 122 | 123 | 124 | 125 | 126 |

Fig. 1B
Prior Art

Cell Cluster of Size 7
Wherein Each Cell
Has X, Y, Z Sectors

Fig. 3

Inherent N = 6 Adjacencies

| Sector # | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Frequency | 1 | 2 | 3 | 4 | 5 | 6 | 7 | 8 | 9 | 10 | 11 | 12 | 13 | 14 | 15 | 16 | 17 | 18 |
|  | 1A | 2A | 3A | 4A | 5A | 6A | 1B | 2B | 3B | 4B | 5B | 6B | 1C | 2C | 3C | 4C | 5C | 6C |

| Sector Adj | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| 1 | 0 | 1 | 2 | 3 | 4 | 5 | 6 | 7 | 8 | 9 | 10 | 11 | 12 | 13 | 14 | 15 | 16 | 17 |
| 2 | 1 | 0 | 1 | 2 | 3 | 4 | 5 | 6 | 7 | 8 | 9 | 10 | 11 | 12 | 13 | 14 | 15 | 16 |
| 3 | 2 | 1 | 0 | 1 | 2 | 3 | 4 | 5 | 6 | 7 | 8 | 9 | 10 | 11 | 12 | 13 | 14 | 15 |
| 4 | 3 | 2 | 1 | 0 | 1 | 2 | 3 | 4 | 5 | 6 | 7 | 8 | 9 | 10 | 11 | 12 | 13 | 14 |
| 5 | 4 | 3 | 2 | 1 | 0 | 1 | 2 | 3 | 4 | 5 | 6 | 7 | 8 | 9 | 10 | 11 | 12 | 13 |
| 6 | 5 | 4 | 3 | 2 | 1 | 0 | 1 | 2 | 3 | 4 | 5 | 6 | 7 | 8 | 9 | 10 | 11 | 12 |
| 7 | 6 | 5 | 4 | 3 | 2 | 1 | 0 | 1 | 2 | 3 | 4 | 5 | 6 | 7 | 8 | 9 | 10 | 11 |
| 8 | 7 | 6 | 5 | 4 | 3 | 2 | 1 | 0 | 1 | 2 | 3 | 4 | 5 | 6 | 7 | 8 | 9 | 10 |
| 9 | 8 | 7 | 6 | 5 | 4 | 3 | 2 | 1 | 0 | 1 | 2 | 3 | 4 | 5 | 6 | 7 | 8 | 9 |
| 10 | 9 | 8 | 7 | 6 | 5 | 4 | 3 | 2 | 1 | 0 | 1 | 2 | 3 | 4 | 5 | 6 | 7 | 8 |
| 11 | 10 | 9 | 8 | 7 | 6 | 5 | 4 | 3 | 2 | 1 | 0 | 1 | 2 | 3 | 4 | 5 | 6 | 7 |
| 12 | 11 | 10 | 9 | 8 | 7 | 6 | 5 | 4 | 3 | 2 | 1 | 0 | 1 | 2 | 3 | 4 | 5 | 6 |
| 13 | 12 | 11 | 10 | 9 | 8 | 7 | 6 | 5 | 4 | 3 | 2 | 1 | 0 | 1 | 2 | 3 | 4 | 5 |
| 14 | 13 | 12 | 11 | 10 | 9 | 8 | 7 | 6 | 5 | 4 | 3 | 2 | 1 | 0 | 1 | 2 | 3 | 4 |
| 15 | 14 | 13 | 12 | 11 | 10 | 9 | 8 | 7 | 6 | 5 | 4 | 3 | 2 | 1 | 0 | 1 | 2 | 3 |
| 16 | 15 | 14 | 13 | 12 | 11 | 10 | 9 | 8 | 7 | 6 | 5 | 4 | 3 | 2 | 1 | 0 | 1 | 2 |
| 17 | 16 | 15 | 14 | 13 | 12 | 11 | 10 | 9 | 8 | 7 | 6 | 5 | 4 | 3 | 2 | 1 | 0 | 1 |
| 18 | 17 | 16 | 15 | 14 | 13 | 12 | 11 | 10 | 9 | 8 | 7 | 6 | 5 | 4 | 3 | 2 | 1 | 0 |

| Min space | 6 | 5 | 4 | 3 | 2 | 1 | 1 | 2 | 3 | 3 | 2 | 1 | 1 | 2 | 3 | 4 | 5 | 6 |
|---|---|---|---|---|---|---|---|---|---|---|---|---|---|---|---|---|---|---|
| Wrap | 1 | 2 | 3 | 4 | 5 | 6 | 7 | 8 | 9 | 9 | 8 | 7 | 6 | 5 | 4 | 3 | 2 | 1 |

Proposed N = 6 Reuse Plan
N = 6 B-Band Frequency Table

| DCCH: | 1X | 2X | 3X | 4X | 5X | 6X | | 1Y | 2Y | 3Y | 4Y | 5Y | 6Y | | 1Z | 2Z | 3Z | 4Z | 5Z | 6Z | |
|---|---|---|---|---|---|---|---|---|---|---|---|---|---|---|---|---|---|---|---|---|---|
| a | 1 | 2 | 3 | 4 | 5 | 6 | 7 | 8 | 9 | 10 | 11 | 12 | 13 | 14 | 15 | 16 | 17 | 18 | 19 | 20 | 21 |
| b | 1 | 2 | 3 | 4 | 5 | 6 | | 7 | 8 | 9 | 10 | 11 | 12 | | 13 | 14 | 15 | 16 | 17 | 18 | |
| VCH | 334 | 335 | 336 | 337 | 338 | 339 | | 340 | 341 | 342 | 343 | 344 | 345 | | 346 | 347 | 348 | 349 | 350 | 351 | |
|  | 352 | 353 |  | *354* |  |  |  | 355 | 356 | 357 |  |  |  |  | 358 | 359 | 360 |  |  |  |  |
|  | 361 | 362 | 363 | 364 | 365 | 366 | 367 | 368 | 369 | 370 | 371 | 372 | 373 | 374 | 375 | 376 | 377 | 378 | 379 | 380 | 381 |
|  | 382 | 383 | 384 | 385 | 386 | 387 | 388 | 389 | 390 | 391 | 392 | 393 | 394 | 395 | 396 | 397 | 398 | 399 | 400 | 401 | 402 |
|  | 403 | 404 | 405 | 406 | 407 | 408 | 409 | 410 | 411 | 412 | 413 | 414 | 415 | 416 | 417 | 418 | 419 | 420 | 421 | 422 | 423 |
|  | 424 | 425 | 426 | 427 | 428 | 429 | 430 | 431 | 432 | 433 | 434 | 435 | 436 | 437 | 438 | 439 | 440 | 441 | 442 | 443 | 444 |
|  | 445 | 446 | 447 | 448 | 449 | 450 | 451 | 452 | 453 | 454 | 455 | 456 | 457 | 458 | 459 | 460 | 461 | 462 | 463 | 464 | 465 |
|  | 466 | 467 | 468 | 469 | 470 | 471 | 472 | 473 | 474 | 475 | 476 | 477 | 478 | 479 | 480 | 481 | 482 | 483 | 484 | 485 | 486 |
|  | 487 | 488 | 489 | 490 | 491 | 492 | 493 | 494 | 495 | 496 | 497 | 498 | 499 | 500 | 501 | 502 | 503 | 504 | 505 | 506 | 507 |
|  | 508 | 509 | 510 | 511 | 512 | 513 | 514 | 515 | 516 | 517 | 518 | 519 | 520 | 521 | 522 | 523 | 524 | 525 | 526 | 527 | 528 |
|  | 529 | 530 | 531 | 532 | 533 | 534 | 535 | 536 | 537 | 538 | 539 | 540 | 541 | 542 | 543 | 544 | 545 | 546 | 547 | 548 | 549 |
|  | 550 | 551 | 552 | 553 | 554 | 555 | 556 | 557 | 558 | 559 | 560 | 561 | 562 | 563 | 564 | 565 | 566 | 567 | 568 | 569 | 570 |
|  | 571 | 572 | 573 | 574 | 575 | 576 | 577 | 578 | 579 | 580 | 581 | 582 | 583 | 584 | 585 | 586 | 587 | 588 | 589 | 590 | 591 |
|  | 592 | 593 | 594 | 595 | 596 | 597 | 598 | 599 | 600 | 601 | 602 | 603 | 604 | 605 | 606 | 607 | 608 | 609 | 610 | 611 | 612 |
|  | 613 | 614 | 615 | 616 | 617 | 618 | 619 | 620 | 621 | 622 | 623 | 624 | 625 | 626 | 627 | 628 | 629 | 630 | 631 | 632 | 633 |
|  | 634 | 635 | 636 | 637 | 638 | 639 | 640 | 641 | 642 | 643 | 644 | 645 | 646 | 647 | 648 | 649 | 650 | 651 | 652 | 653 | 654 |
|  |  | 655 | 656 | 657 | 658 |  |  |  | 659 | 660 | 661 | 662 |  |  |  | 663 | 664 | 665 | 666 |  |  |
| VCH' | | 717 | 718 | 719 | 720 | 721 | 722 | 723 | 724 | 725 | 726 | 727 | 728 | 729 | 730 | 731 | 732 | 733 | 734 | 735 | 736 |
|  | 737 | 738 | 739 | 740 | 741 | 742 | 743 | 744 | 745 | 746 | 747 | 748 | 749 | 750 | 751 | 752 | 753 | 754 | 755 | 756 | 757 |
|  | 758 | 759 | 760 | 761 | 762 | 763 | 764 | 765 | 766 | 767 | 768 | 769 | 770 | 771 | 772 | 773 | 774 | 775 | 776 | 777 | 778 |
|  | 779 | 780 | 781 | 782 | 783 | 784 | 785 | 786 | 787 | 788 | 789 | 790 | 791 | 792 | 793 | 794 | 795 | 796 | 797 | 798 | 799 |

Totals

| | | | | | | | | | | | | | | | | | | | | | |
|---|---|---|---|---|---|---|---|---|---|---|---|---|---|---|---|---|---|---|---|---|
| DCCH | 2 | 1 | 2 | 1 | 2 | 1 | | 2 | 1 | 2 | 1 | 2 | 1 | | 2 | 1 | 2 | 1 | 2 | 1 | |
| VCH | 14 | 15 | 15 | 15 | 15 | 14 | 14 | 14 | 15 | 15 | 15 | 15 | 14 | 14 | 14 | 15 | 15 | 15 | 15 | 14 | 14 |
| VCH' | 3 | 4 | 4 | 4 | 4 | 4 | 4 | 4 | 4 | 4 | 4 | 4 | 4 | 4 | 4 | 4 | 4 | 4 | 4 | 4 | 4 |
| Combined | 19 | 20 | 21 | 20 | 21 | 19 | 18 | 20 | 20 | 21 | 20 | 21 | 19 | 18 | 20 | 20 | 21 | 20 | 21 | 19 | 18 |

Note: *354* was not used in the proposed DCCH reuse plan

Proposed DCCH Reuse Plan

METHOD AND SYSTEM FOR SOLVING CELLULAR COMMUNICATIONS FREQUENCY PLANNING PROBLEM

CROSS-REFERENCE TO RELATED PATENT APPLICATION

The present invention is related to the subject matter of the provisional United States Patent Application entitled "An N=6 Frequency Plan for High Capacity TDMA/AMPS Systems," filed Jul. 17, 1997, application Ser. No. 60/052,886, assigned to the assignee herein named. Applicants hereby claim the benefit under 35 U.S.C. §119(e) of the provisional application. The contents of the provisional patent application are hereby incorporated by reference in their entirety.

BACKGROUND OF THE INVENTION

1. Technical Field

The present invention relates, in general, to an improved method and system to be utilized with wireless communication systems having cellular architectures. In particular, the present invention relates to an improved method and system, to be utilized with wireless communication systems having cellular architectures, and which assign groups of channels to individual cells within the system in such a fashion that system-wide channel interference is minimized over some defined geographical area.

2. Description of the Related Art

The present invention is related to wireless communication systems, and, in particular, to wireless communication systems having a cellular architecture (e.g., cellular telephony, Personal Communication Systems, or Global System for Mobil Communication). Wireless communication refers to the fact that transmission between sending and receiving stations occurs via electromagnetic radiation not guided by any hard physical path (e.g., by microwave link.) Cellular architecture refers to the fact that the wireless system effects service over an area by utilizing a system that can be pictographically represented as a cellular grid.

Wireless cellular communication is the latest incarnation of a technology that was originally known as mobile telephone systems. Early mobile telephone system architecture was structured similar to television broadcasting. That is, one very powerful transmitter located at the highest spot in an area would broadcast in a very large radius. If a user were in the useable radius, then that user could broadcast to the base station and communicate by radiotelephone to the base station. However, such systems proved to be very expensive for the users and not very profitable to the communication companies supplying such services. The primary limiting factor of the original mobile telephone systems was that the number of channels available for use was limited due to severe channel-to-channel interference within the area served by the powerful transmitter. Thus, a problem arose as to how to provide more channels within the service area.

Counterintuitively, engineers discovered that channel-to-channel interference effects within the service area were not due solely to the distance between stations communicating with the base transmitter (which intuitively would seem to give rise to the interference), but were also inversely related to the transmitter power (radius) of the area being served by the transmitter. Engineers found that by reducing the radius of an area by fifty percent, service providers could increase the number of potential customers in an area fourfold. It was found that systems based on areas one-kilometer in radius would have one hundred times more channels than systems based on areas ten-kilometers in radius. Speculation led to the conclusion that by reducing the radius of areas to a few hundred meters, the number of calls that could be served by each cell could be greatly increased.

Thus, reducing the power of the central transmitter allowed a significant increase in the number of available channels by reducing channel-to-channel interference within an area. However, as the power of the central transmitter was reduced, the serviceable area was also reduced. Thus, although reducing transmission power increased the number of available channels, the small service area provided by such reduced power did not make such radio telephone systems attractive communication options for many users. Thus, a problem arose relating to how to utilize the discovery that smaller cell sizes increased available channels in a fashion that would provide service attractive to users.

This problem was solved by the invention of the wireless cellular architecture concept. The wireless cellular architecture concept utilizes geographical subunits called "cells" and is buttressed by what is known as a frequency reuse concept. A cell is the basic geographic unit of a cellular system. Cells are base stations (a base station consists of hardware located at the defining location of a cell and includes power sources, interface equipment, radio frequency transmitters and receivers, and antenna systems) transmitting over small geographic areas that are represented as hexagons. Each cell size varies depending on the landscape. The term "cellular" comes from the honeycomb shape of the areas into which a coverage region is divided. Because of constraints imposed by natural terrain and man-made structures, the true shape of cells is not a perfect hexagon, but such shape serves as an effective tool for design engineering.

Within each cell a base station controller talks to many mobile subscriber units at once, utilizing one defined transmit/receive communications channel per mobile subscriber unit. A mobile subscriber unit (a control unit and a transceiver that transmits and receives wireless transmissions to and from a cell site) uses a separate, temporary wireless channel to talk to a cell site. Transmit/receive communication channels utilize a pair of frequencies for communication—one for transmitting from the cell site base station controller, named the forward link, and one frequency for the cell site to receive calls from the users, named the reverse link. Both the forward and reverse link must have sufficient bandwidth to allow transmission of user data.

The frequency reuse concept is what made wireless cellular communications a viable reality. Wireless communication is regulated by government bodies (e.g., the Federal Communications Commission.) Government bodies dictate what frequencies in the wireless spectrum can be utilized for particular applications. Consequently, there is a finite set of frequencies available for use with cellular communications. The frequency reuse concept is based on assigning to each cell a group of radio channels used within a small geographic area (cell). Adjacent cells are assigned a group of channels that is completely different from any neighboring cell. Thus, in the frequency reuse concept there are always buffer cells between two cells utilizing the same set of frequencies. The cells are sized such that it is not likely that two cells utilizing the same set of frequencies will interfere with each other. Thus, such a scheme allows "frequency reuse" by non-adjacent cells.

Since each contiguous cell utilizes different frequencies, the ability for such a system to supply continuous service across a cell grid requires that a call-in-progress be switched to a new transmit/receive channel as a user transits from one cell into another. That is, since adjacent areas do not use the same wireless channels, a call must either be dropped or transferred from one wireless channel to another when a user crosses the line between adjacent cells. Because dropping the call is unacceptable, the process of "handoff" was created. Handoff occurs when the mobile telephone network automatically transfers a call from wireless channel to wireless channel as a mobile subscriber unit crosses adjacent cells.

Handoff works as follows. During a call, a moving mobile subscriber unit is utilizing one voice channel. When the mobile unit moves out of the coverage area of a given cell site, the reception becomes weak. At this point, the base station controller in use requests a handoff. The system switches the call to another different frequency channel in a new cell without interrupting the call or alerting the user. The call continues as long as the user is talking, and generally the user barely notices the handoff.

The foregoing ideas of cells, frequency reuse, and handoff constituted the invention of the cellular concept. The invention of the cellular concept made the idea of wireless cellular communications a viable commercial reality.

As noted previously, the frequency reuse concept requires assigning groups of cells different groups of frequencies. In practice, in order to do the assignment engineers first assume an ideal hexagon layout of the network and apply an ideal frequency assignment pattern "as if" the distribution of the electromagnetic energy being transmitted to achieve communication perfectly matches the hexagonal shapes.

The frequency assignment method is typically done on some variation of a graph coloring approach. Those skilled in the art will recognize that graph coloring recognizes that with at least three different colors a graph can be colored such that each no two contiguous graph shapes have the same color. Accordingly, under the graph coloring approach, the assignment problem is formulated as a graph coloring problem where different channels will be grouped into at least three groups, and the at least three groups are thereafter assigned colors. Thereafter, each hexagon is colored such that no hexagons of the same color are directly adjacent, which is a way to assure that no two cells adjacent cells will be utilizing the same group of channels. In addition, there have been attempts to train neural networks to mimic what human engineers do by experience and intuition.

FIGS. 1A, 1B, and 1C illustrate how the frequency assignment problem is typically solved. In FIG. 1A there is depicted a cell cluster within a wireless communication system having a cellular architecture. Recall that in the above discussion it was noted that frequency reuse is a concept that has been utilized to allow cellular communications over a large area. It is common to create a cell cluster composed of idealized hexagonal cells, as is shown in FIG. 1A, whereby the frequency reuse concept is implemented. A cell cluster is a group of cells. Typically, no channels are reused within a cluster. FIG. 1A illustrates seven-cell cluster 100.

A "cell" is the basic geographic unit of a cellular system. The term "cellular" comes from the honeycomb shape of the areas into which a coverage region is divided. In FIG. 1A each cell 101, 102, 103, 104, 105, 106, and 107 is depicted as a honeycomb shape within which base stations 111, 112, 113, 114, 115, 116 and 117, respectively, are shown. Cells are pictographic representations of the effective geographic area of base station (a base station includes but is not limited to transmitters and receivers sufficient to service existing cell channels within a particular cell) transmitters that are for convenience represented as hexagons. Each cell size varies depending on the landscape. Because of constraints imposed by natural terrain and man-made structures, the true shape of cells is not a perfect hexagon.

Since seven-cell cluster 100 utilizes the frequency reuse concept, each cell in FIG. 1A utilizes a set of channels wherein each channel is based upon a set of carrier frequencies different from those utilized by any other cell 101, 102, 103, 104, 105, 106, 107 within 7-cell cluster 100 (an example of how this can be actually achieved is set forth in FIGS. 1B and 1C, below). Thus, if available frequencies are divided evenly, each cell 101, 102, 103, 104, 105, 106, and 107 will utilize $1/7$ of frequencies available for utilization.

When available frequencies are reused across 7-cell cluster 100, it is said that the system has a frequency reuse factor of N=7. As an aid to engineering, frequency reuse tables have been constructed to help communications engineers map the appropriate frequencies into the appropriate cells in as efficient a manner possible under the state of the art.

An example of such a frequency reuse table appears in FIG. 1B.

FIG. 1B depicts an exemplary frequency-reuse table for a system where N=7 (e.g., the frequencies are being re-used across a 7-cell cluster). In a standard system, it is common to have 21 carrier frequency groups available. The frequency reuse table is constructed by creating a first row containing 21 available carrier frequencies. Thereafter, subsequent rows are constructed such that each column in the table has 21 channel frequency separation from the other channels in the column. For example, in the second row it is shown that the 22nd carrier-frequency-in-sequence channel is assigned into channel group 1; thereafter, the same general scheme is followed until all available carriers are so assigned.

Subsequent to constructing the frequency table of FIG. 1A, each 7 contiguous channel groups are assigned onto 7-cell clusters, such as 7-cell cluster 100. To do this, each cell is first divided into three "sectors" x, y, and z. FIG. 1C illustrates a three sector cell representation of a 7-cell cluster. Shown is that each cell in the 7-cell cluster 150 is divided into three sectors x, y, and z. Consequently, shown in FIG. 1C are sectors $x_{1-7}$, $y_{1-7}$, $z_{1-7}$.

With respect to the tri-sector cells of FIG. 1C and the frequency reuse table of FIG. 1B, it is typical to assign channel group 1–7 to sectors $x_{1-7}$, channel groups 8–14 to a sectors $y_{1-7}$, and channel groups 15–21 to sectors $z_{1-7}$. Thereafter, such mapping is repeated over the geographic area such that no sectors with the same subscripts are adjacent.

Inspection of the assignment of frequency groups as shown in FIGS. 1B–1C shows that such assignments make sure that no directly-adjacent carrier frequencies are extant in adjacent sectors. That is, the N=7 scheme in conjunction with the 21 group frequency reuse table insures that buffer zones exist between sectors such that adjacent sectors do not have directly-adjacent carrier frequencies. Consequently, such a system is "balanced" in that it insures that a buffer sector is always available between sectors utilizing the same or directly-adjacent frequencies. It has been found empirically that such assignment gives the best overall system signal-to-noise ratios under the state of the art.

Relatively recently, increasing user bandwidth requirements have prompted communications engineers to attempt to construct frequency reuse schemes which increase bandwidth. One such scheme is an N=6frequency reuse concept. In an N=6 frequency reuse concept, the available frequencies are reused across 6 cells rather than 7. Since such a scheme no longer provides for the perfect buffer zones, or no longer provides the "balance" demonstrated via FIGS. 1B and 1C, the system wide signal-to-noise ratio is generally worse than that for an N=7 system. However, by a trial and error approach communications engineers are generally able to achieve an increase in bandwidth such that from a cost-benefit analysis standpoint the decrease in signal-to-noise ratio is acceptable given the increased bandwidth yielded by such N=6 schemes.

The electromagnetic energy very rarely matches the perfectly arranged hexagonal shapes shown. Variations in terrain and buildings often disrupt the transmitted electromagnetic energy. Consequently, after such an N=6 scheme has been laid out and groups of frequencies assigned, it is generally found that the frequency assignments are grossly inadequate. Thus, subsequent to the N=6 assignment, it is typical that a long period of "trial and error" is engaged in where engineers actually go out and empirically determine the true distribution of the individual cells (which often is radically different in shape than the idealized hexagon). Then, after the shape has been adequately determined, the engineers measure the interference in the cells utilizing different channel group assignments and subsequently assign groups of channels based upon the empirical data.

While a similar labor-intensive process is engaged in for the N=7 schemes, those skilled in the art will recognize that much more labor intenisivity is generally required for the N=6 schemes, due the fact that the N=6 schemes have less buffer zones to start with, which gives rise to numerous directly-adjacent channels between directly adjacent sectors.

It is undeniable that the increased bandwidth of N=6 schemes is very desirable. However, as has been discussed, the ultimate deployment of such systems is difficult due to their unbalanced nature.

It is therefore apparent that a need exists for a method and system which allow an increase in bandwidth over and above that of currently available relatively balanced systems, including but not limited to the N=7 scheme, and yet substantially decrease or eliminate the costs, such as directly-adjacent channels, decreased signal-to-noise ratios, and increased difficulty in depolyablitiy, ordinarily associated with such an increase in bandwidth over and above that of currently available relatively balanced systems.

SUMMARY OF THE INVENTION

It is therefore one object of the present invention to provide an improved method and system to be utilized with wireless communication systems having cellular architectures.

It is another object of the present invention to provide an improved method and system, to be utilized with wireless communication systems having cellular architectures, and which assign groups of channels to individual cells within the system in such a fashion that system-wide channel interference is minimized over some defined geographical area.

The method and system accomplish their objects via the use of communications equipment adapted to do the following: define a geographic area; map the defined geographic area with at least one high bandwidth cell cluster wherein each cell has at least one sector; and eliminate channel adjacencies by selectively assigning channels, drawn from the plurality of groups of channels, to the at least one high bandwidth cell cluster. The method and system further accomplish their objects via the use of communications equipment adapted to do the following: select a frequency reuse table having a predefined frequency reuse factor; and define a high bandwidth cell cluster over which the frequency reuse table is utilized such that the defined frequency reuse factor is effectively maintained while the communications efficiency of a wireless communications system is enhanced.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of utilization, further objects and advantages thereof, will best be understood by reference to the following detailed description of an illustrative embodiment when read in conjunction with the accompanying drawings, wherein:

FIG. 1B depicts an exemplary frequency-reuse table for a system where N=7 (e.g., the frequencies are being re-used across a 7-cell cluster);

FIG. 3 illustrates a table which sets forth the best mapping under the scheme shown in FIG. 2;

FIG. 4 depicts, via use of a 21 column frequency planning table, how a second embodiment of the present invention allows the creation of a high-bandwidth N=6 plan and eliminates the inherent channel adjacencies identified above which are associated with a high bandwidth cluster;

DETAILED DESCRIPTION OF ILLUSTRATIVE EMBODIMENT

Figure 1A:
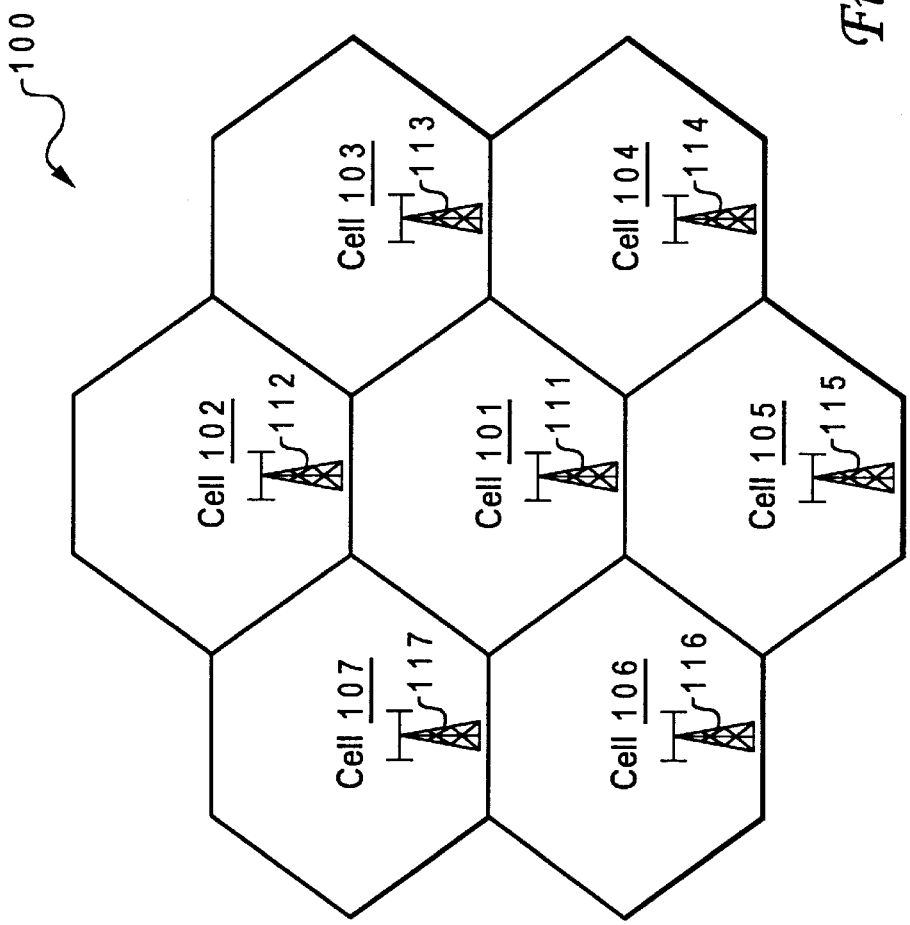
FIG. 1A depicts a cell cluster within a wireless communication system having a cellular architecture.

The present invention represents a radical departure from previous methods and systems providing solutions to the frequency assignment problem. As was mentioned above, typical solutions to the problem generally proceed as follows: (1) an assumption is made as to the number of sectorized cells in a cell cluster across which frequency groups are to be reused, (2) a frequency assignment table appropriate to the chosen number of cells in the cluster is obtained—typically from a cellular reference handbook, and (3) trial-and-error is engaged in to achieve acceptable system performance when the number of available sectors in a cell cluster do not allow for a completely "balanced" system wherein no directly-adjacent carriers are present within directly adjacent sectors. The methodology used to originally generate the frequency assignment tables historically was that at the sector level you have multiple channels in one sector, and in order to transmit in a sector you have one antenna over which the multiple channels are to be transmitted. The transmission is effected via the use of a tuned combiner, and the tuned combiner requirements are such that it has a minimum requirement for channel spacing such that one channel will not interfere with, or get "smeared" into, another. The frequency assignment tables are generated such that all frequencies in the channel group used within a sector can be handled by the tuned combiner without undue distortion or interference. The frequency groups are generated by arranging consecutive ascending frequency groups (usually by use of a spiral, or coil, type drawing wherein the ascending frequencies are arranged along the coil) such that the frequencies assigned to each group can effectively clear the tuned combiner and the required reuse across the designated number of cells. However, those skilled in the art will recognize that most practicing engineers are not aware of the origins of the tables, but rather just use the tables as they would any other engineering constant.

The present invention represents a radical departure from the typical solutions in that it completely inverts the normal order of solution. Rather than starting with the number of cells in a defined cell cluster and assigning the available frequency based on the number of cells, one embodiment of the present invention functions as follows: (1) a frequency-reuse table is obtained; (2) the number of cells in the cell cluster for which the frequency reuse table was matched or generated is determined; (3) a new cell cluster is generated by adding at least one complete or partial duplicate of the cell cluster for which the frequency reuse table is matched or generated to the original cell cluster; and (4) a manner in which groups from the frequency reuse table are reused across the new cell cluster is designated such that the frequency reuse factor of the frequency reuse table is preserved while simultaneously substantially minimizing any directly-adjacent channels in directly adjacent sectors.

Another embodiment of the present invention functions as follows: (1) a frequency-reuse table is obtained; (2) the number of cells in the cell cluster for which the frequency reuse table was matched or generated is noted; (3) a new cell cluster is generated by adding at least one complete or partial duplicate of the cell cluster for which the frequency reuse table is matched or generated to the original cell cluster; (4) certain channel group(s) from the frequency-reuse table are reserved; (5) the manner in which non-reserved channel groups are reused across the new cell cluster is designated. Furthermore, yet another embodiment encompasses the five foregoing operations and adds a sixth operation which designates the manner in which the reserved certain channel groups from the frequency reuse table are reused across the new cell cluster such that the frequency reuse factor of the frequency reuse table is preserved while simultaneously substantially eliminating any directly-adjacent channels in directly adjacent sectors. Still yet another embodiment extends either or both of the foregoing two embodiments by adding the operations of subdividing one or more reserved channel groups and thereafter dictating the way in which such subdivisions can be assigned, which also substantially eliminates any directly-adjacent channels in directly adjacent sectors but additionally gives yet an additional increase in bandwidth.

The foregoing described and other embodiments will be set forth below. However, as has been and will be seen, all embodiments totally invert the direction and order in which the problem is normally solved under the current state of the art. That is, the current art teaches away from the present invention.

Figure 2:
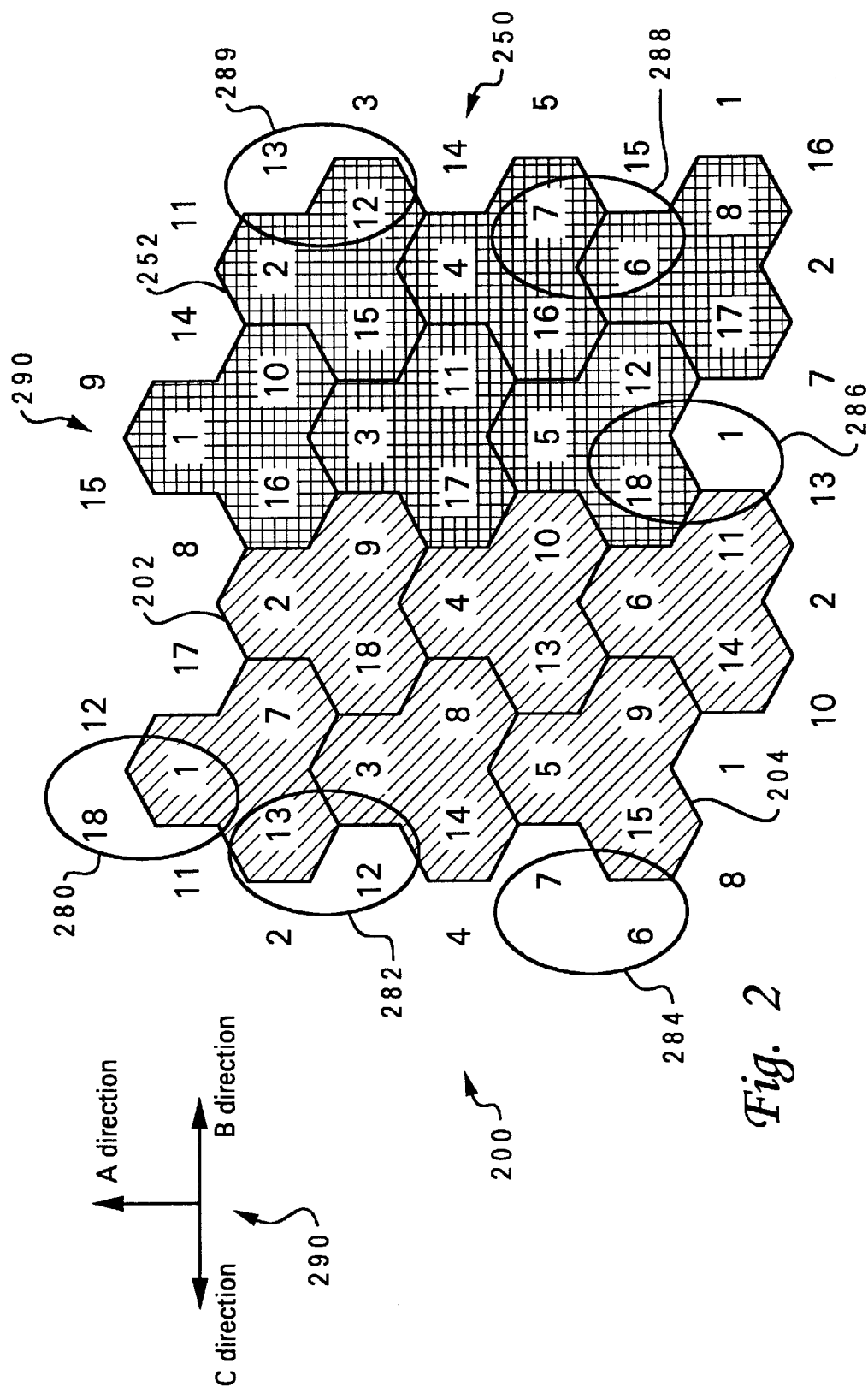
FIG. 2 depicts a new "high bandwidth" cluster constructed to effect one embodiment of the present invention.

Refer now to FIG. 2. FIG. 2 depicts a new "high bandwidth" cluster constructed to effect one embodiment of the present invention. Several cells (e.g., 202, 204, 252) are shown in FIG. 2. However, rather than the more well-known hexagonal cell, the cells are shown in "tri-cellular" form. Those skilled in the art will recognize that it is common for a cell to be served by three directional antennas, arranged such that the antenna patterns carve out three relatively non-overlapping coverage areas in the cell. Each single antenna coverage area in the cell is typically termed a cell "sector." Accordingly, "tri-cellular" cell representations have been developed which pictographically represent idealized three-antenna reality.

This sectorized form of the cell can be understood by recalling that, in practice, cells are typically defined by at least three directional antennas. Viewed in this fashion it can be seen that the three sector, or tri-cellular, cell is roughly correspondent to the three directional antenna patterns within the cell. Thus, each sector of each cell correspondent to a useable region within the tri-cellular cell is typically referred to as a cell sector.

Figure 1C:
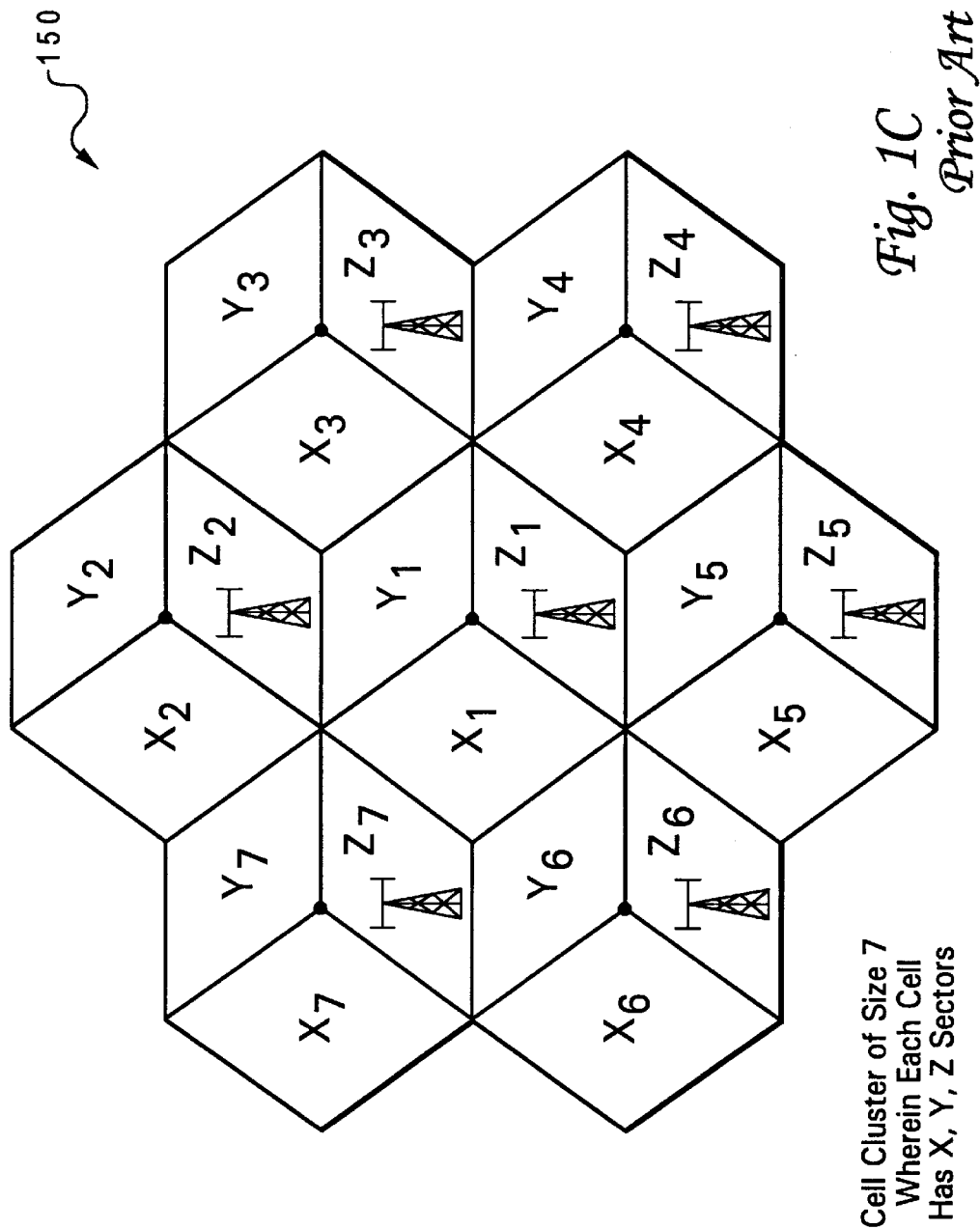
FIG. 1C illustrates a three sector cell representation of a 7-cell cluster which is utilized to illustrate the use of a frequency-reuse table.

Notice that each individual cell (e.g., 202, 204, 252) looks amazingly similar to three standard hexagonal cells in contact with each other (e.g. as if cells 101, 103, and 104 of FIG. 1A were being viewed in isolation from the other cells in FIG. 1), which is why such cells are referred to as tri-cellular. This similarity has been recognized by communications engineers. The communications engineers have used this similarity to map different channel groups from a conventional 18 column N=6 frequency reuse plan into the individual sectors within the sectors of the tri-cellular cells.

Under this scheme, each "sector" of each tri-cellular cell is viewed as being composed of three "cell-like" sectors. When viewed in this way, it can be seen that each 6-cell cluster is composed of 18 cell-like sectors, and thus the conventual 18 column (or frequency group) N=6 frequency reuse table can be completely mapped onto each 6-cell cluster by treating each cell-like sector as if it were actually a cell in a fashion analogous to the assignment of the 21 column N=7 frequency reuse table which was described above in relation to FIGS. 1B and 1C.

It was explained in the description of the related art that it is well known in the art that the 18 column (or frequency group) N=6 frequency reuse table mapping results in directly-adjacent channels in directly adjacent cells, arising from the fact that a standard N=6 scheme is unbalanced. Such adjacencies are inherent in the standard N=6 scheme and cannot be alleviated but for the present invention.

FIG. 2 depicts a new "high bandwidth" cluster 290 composed of two separate 6-cell clusters 200 and 250 which substantially minimizes adjacencies when a standard 18-column (or frequency group) N=6 frequency reuse table is used. This substantial minimization is achieved by the mapping designated within high bandwidth cluster 290. Illustrated in FIG. 2 via the numbers 1 through 18 are the required mapping of frequency groups from an 18-column (or frequency group) N=6 table. Careful attention to the sectors within the 6 cells of cell cluster 200 will reveal that all 18 frequency groups are not reused in cell cluster 200. However, when careful attention is paid to the sectors within the 6 cells of cell cluster 250 in conjunction with the sectors within the 6 cells of cell cluster 200, it will be seen that across the 12 cells, or 36 sectors, of high bandwidth cluster 290, all 18 frequency groups have been reused twice. Consequently, the frequency reuse factor of high bandwidth cluster 290 is effectively N=6.

In this embodiment of the present invention, once a geographic area is defined, such an area is mapped by the alternating patterns shown in high bandwidth cluster 290 composed of cell clusters 200 and 250 (the way in which the clusters fit together is defined by the channel numbers on the outside peripheries of cell clusters 200 and 250).

Applicants have empirically determined the best mapping that can be achieved under the scheme shown in FIG. 2. The results of their experimentation are set forth in FIG. 3. Shown in FIG. 3 is table 300 which sets forth what has empirically been determined to be the preferable mapping under the scheme shown in FIG. 2, and furthermore shows the channel adjacencies present in the high bandwidth cluster 290 system which gives rise to an effective frequency reuse factor of N=6. In FIG. 2, these regions where adjacencies cannot be eliminated are shown as semi-circular areas 280, 282, 284, 286, 288, and 289. Those skilled in the art will recognize that the number of adjacencies shown in FIG. 2 and FIG. 3 are substantially less than those inherent in standard 18-column N=6 frequency reuse systems. Thus, the method and system of FIGS. 2 and 3 substantially minimize the adjacencies present when an 18-column N=6 frequency reuse table is used.

Table 300 in conjunction with FIG. 2 shows that sectors {1, 2, 3, 4, 5, 6}, which are oriented in the A direction, are all adjacent to sectors {7, 8, 9, 10, 11, 12} in the B direction and sectors {13, 14, 15, 16, 17, 18} in the C direction. The same is true for sectors in B with respect to the sectors in the A and C directions, as well as for C with respect to A and B. (The directions A, B, and C can be determined by inspection of table 300 in conjunction with FIG. 2, but have also been additionally defined by directional coordinate axis 290 in FIG. 2).

For sector 1 in the A direction, one can assign a channel f1 out of the total set of eighteen consecutive channels. This will leave two adjacent channels f1−1 and f1+1 in the remaining set. One can also assign f2 out of the remaining set to the sector 2. This will leave two adjacent channels f2−1 and f2+1 in the remaining set. After allocating all six sectors in direction A with channels f1 through f6, there are at least seven adjacent channels among channels in the A direction. Five of those are internal adjacencies among the channels in direction A, the remaining two are adjacent with channels in directions B and C. The same is true when allocating channels in directions B and C. Therefore there will be six adjacencies among directions A, B, and C. However, since it has been found empirically that adjacencies always occur in pairs, there are only three pairs of adjacencies which can not be avoided when allocating eighteen contiguous channel sets to an N=6 frequency reuse plan.

Figure 5:
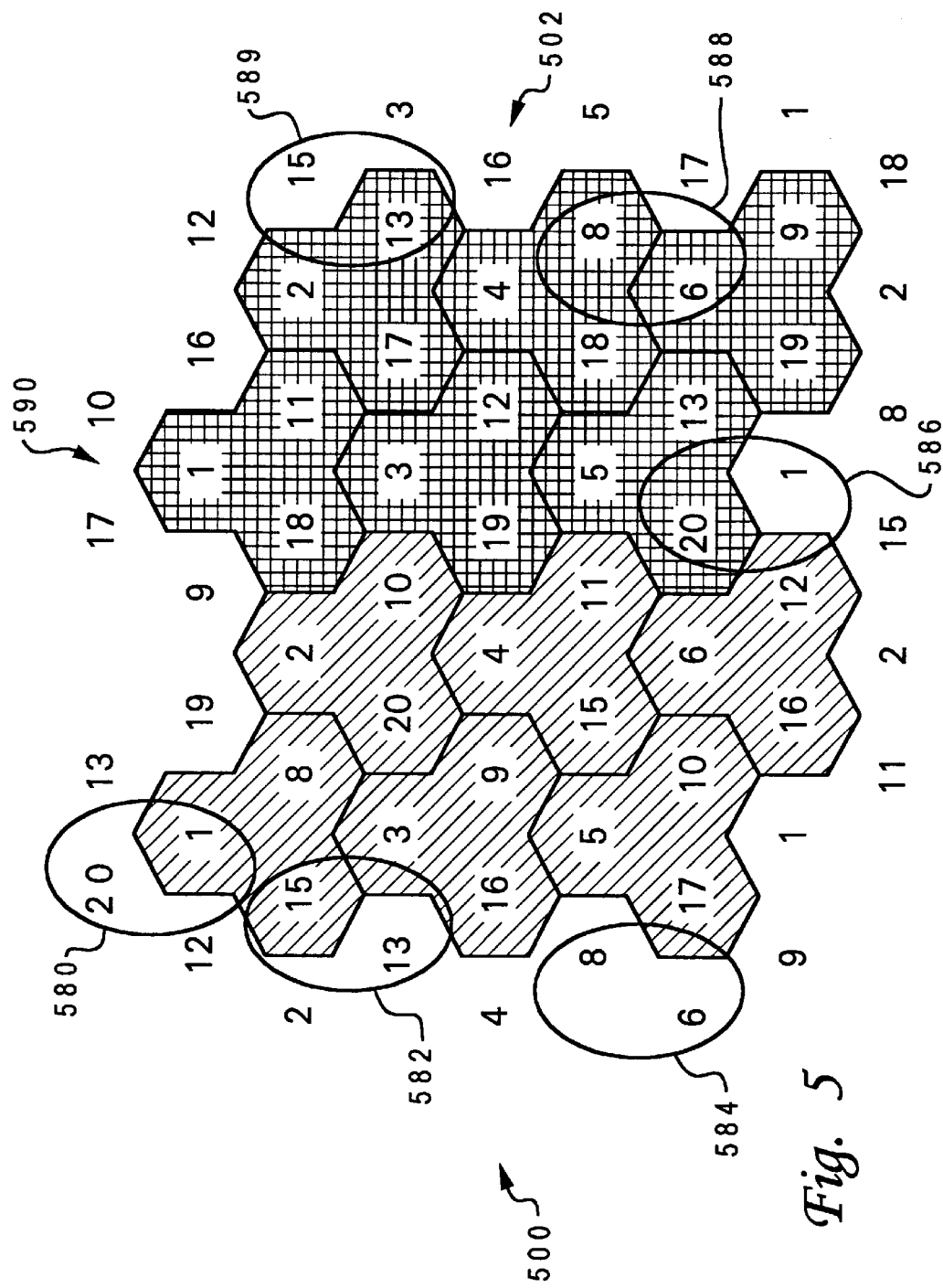
FIG. 5 depicts pictographically how the scheme depicted in FIG. 4 eliminates the channel adjacencies.

As good as the improvements associated with the high bandwidth cluster 290 method and system of FIGS. 2 and 3 are, it would be better if the adjacencies could be substantially eliminated rather than substantially minimized. FIGS. 4 and 5 depict an embodiment of the present invention wherein this substantial elimination is achieved.

Refer now to FIGS. 4 and 5. FIG. 4 depicts, via use of a 21 column frequency planning table, how one embodiment of the present invention allows the creation of a high-bandwidth N=6 plan and eliminates the inherent channel adjacencies identified above which are associated with high bandwidth cluster 290. FIG. 5 depicts pictographically how the scheme depicted in FIG. 4 eliminates the channel adjacencies.

Refer now to FIGS. 4 and 5. Shown in FIG. 4 is 21 column frequency reuse table 400 modified in accord with one embodiment of the present invention. With respect to the table, channel groups (or columns) 7, 14, and 21 are reserved during the base planning stage of channel assignments. As can be seen from the table, such reservation demarks three sets of six columns. Set 402 consists of channel groups 1–6, set 404 consists of channel groups 8–13, and set 406 consists of channel groups 15–20.

Shown in FIG. 5 is an N=6 assignment scheme based upon the table shown in FIG. 4. Analogous to the situation FIG. 2, shown is high bandwidth cluster 590 composed of two 6-cell tri-cellular clusters 500 and 502 mapping a defined geographic area. The channel group assignments from table 400 to the sectors are denoted by the numbers in the cell sectors. Also, shown are regions 580, 582, 584, 586, 588, and 589 which illustrate that the adjacencies shown as semi-circular areas 280, 282, 284, 286, 288, and 289 in FIG. 2 have been eliminated by the channel group assignments. The channel assignments shown in high bandwidth cluster 590 composed of cell clusters 500 and 502 define the initial frequency assignment under this embodiment.

When frequency assignment is to be done on a certain geographic area, the initial 12 cells of high bandwidth cluster 590 are laid out and the frequency groups of table 400 are assigned as dictated by the channel group numbers shown in the 12 sectors of high bandwidth cluster 590 composed of cell clusters 500 and 502. After the initial 12 cells have been assigned frequency groups as mandated by high bandwidth cluster 590 composed of cell clusters 500 and 502, subsequent cells are to follow the pattern set forth in high bandwidth cluster 590 composed of cell clusters 500 and 502. The way in which the additional cell clusters are to be added is illustrated by the channel group numbers surrounding the periphery of high bandwidth cluster 590 composed of cell clusters 500 and 502.

Notice that along the upper left hand quadrant of FIG. 5, along the outside border of cell cluster 500, the channel group numbers 20, 13, 19, and 9 appear when the upper-left outside border of cell cluster 500 is traversed in clockwise fashion. Now notice that this same channel group sequence appears in the lower-left quadrant of FIG. 5, in the bottom-most sectorized cells of cell cluster 502.

From the foregoing, it can be seen that the channel group numbers around the periphery instruct as how to piece together the high bandwidth cluster 590 composed of cell clusters 500 and 502. That is, the channel group numbers 20, 13, 19, and 9 appearing along the upper-left outside border of cell cluster 500 instruct that the high bandwidth cluster 590 is to be positioned such that the frequency assignment shown in cell cluster 502 are to be repeated in the region above cell cluster 501, and that the way in which the assignment is to be repeated is for high bandwidth cluster 590 to be placed such that the portion of high bandwidth cluster 590 defined by cell cluster 502 is "fitted" into the upper left quadrant such that the frequency assignment of the repeated cell cluster 502 match the channel group numbers 20, 13, 19, and 9 appearing along the upper-left outside border of cell cluster 500. Careful perusal of FIG. 5 will show that a similar operation can be engaged in using the other numbers surrounding the periphery of high bandwidth cluster 590 composed of cell clusters 500 and 502. Thus, FIGS. 4 and 5 together instruct how initial frequency group assignments are to be done over a geographic area. Furthermore, FIG. 7, below shows such repetitive mapping with a large number of repeated cell clusters.

Once the initial frequency group assignments have been completed as directed by table 400 in conjunction with the channel group assignments of high bandwidth cluster 590 composed of cell clusters 500 and 502 as defined by FIGS. 4 and 5, the next phase in frequency group assignment is effected. This next phase consists of assigning the remaining frequencies from reserved columns 7, 14, and 21 of table 400.

Figure 6:
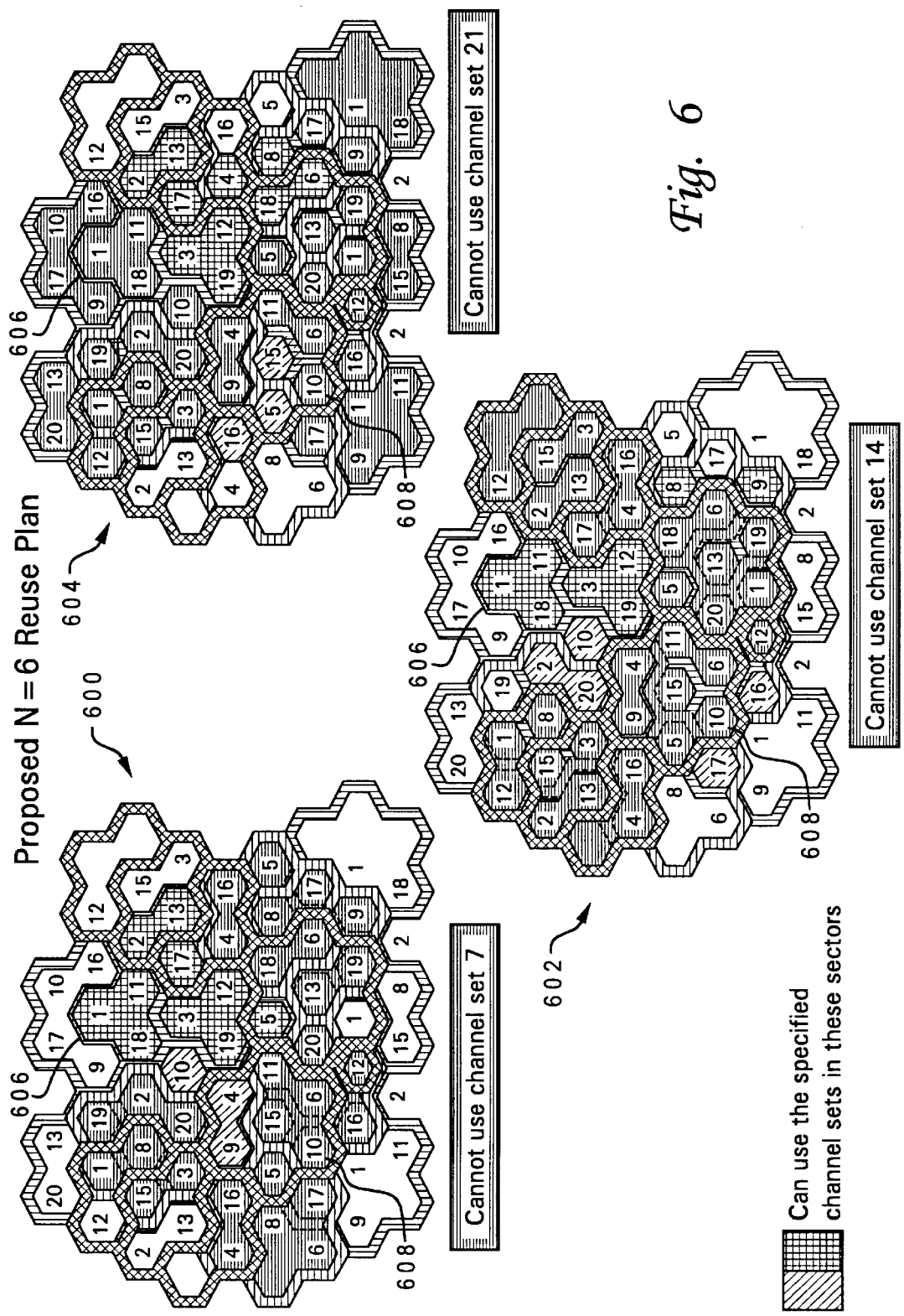
FIG. 6 indicates how the frequencies from the reserved frequency groups are to be assigned.

Refer now to FIG. 6. FIG. 6 indicates how the remaining frequencies from the reserved frequency groups are to be assigned. Shown are three grids 600, 602, and 604 corresponding with the three reserved channel groups (or columns) 7, 14, and 21 of table 400. Each grid 600, 602, and 604 depicts high bandwidth cluster 590 composed of two basic cell clusters 500 and 502 contiguous with which other high bandwidth clusters 590 composed of cell clusters 500 and 502 that have been placed as was discussed above in relation to FIGS. 4 and 5 (e.g., the channel group assignment patterns defined by high bandwidth cluster 590 composed of cell clusters 500 and 502 are repeated in the fashion dictated by the channel group numbers along the periphery of cell clusters 500 and 502 as illustrated in FIG. 5).

Each grid 600, 602, and 604 defines specific sectors within the sectorized cells in cell groups 600, 602, and 604 wherein one of the reserved channel groups 7, 14, or 21 of FIG. 4 are not to be used. Grids 600, 602, and 604 illustrate that after the base channels have been assigned over the grid, as set forth in FIG. 5, the reserved channel groups can be assigned. In order to determine what channel group to assign to what sector, the sector to which one or more frequencies from a frequency group are to be assigned is selected. Thereafter, grids 600, 602, and 604 are consulted to determine what frequency groups can be used in that sector. The presence of the horizontal lines within sectors and/or cells of each grid 600, 602, and 604 indicates that the channel group with which the grid is associated cannot be used where the horizontal lines appear. That is, the sectors with horizontal lines running through them in grid 600 indicate that channel set 7 cannot be used in such sectors. The sectors with horizontal lines running through them in grid 602 indicate that channel set 14 cannot be used in such sectors. The sectors with horizontal lines running through them in grid 604 indicate that channel set 21 cannot be used in such sectors. The implication is that if none of grids 600, 602, and 604 indicate that the channel group cannot be used in the selected sector, then one is free to assign a frequency from reserved channel groups 7, 14, or 21 to that sector. An few examples will make this more clear.

Assume that it is desired to assign one or more frequencies from the reserved frequency groups to sectors within cell 606. Reference to grid 600 shows that reserved channel set 7 can be used in sectors within cell 606. Reference to grid 602 shows that reserved channel set 14 can be used in sectors within cell 606. Reference to grid 604 shows that reserved channel set 21 cannot be used in sectors within cell 606. Thus, channels from either channel group 7 and/or 14 can be assigned to sectors within cell 606.

Note also that rather than referring to whole cells, reference can be made to sectors within the cells. Assume that is desired to assign one or more frequencies from the reserved frequency groups to sector 608. Reference to grid 600 shows that reserved channel set 7 cannot be used in sector 608. Reference to grid 602 shows that reserved channel set 14 cannot be used in sector 608. Reference to grid 604 shows that reserved channel set 21 cannot be used in sector 608. Thus, no frequencies from the reserved channel groups can be assigned to sector 608.

FIGS. 4, 5, and 6 have thus far been used to define a second embodiment of the present invention. They can also be used, in conjunction with FIG. 7, to define a third embodiment.

Figure 7:
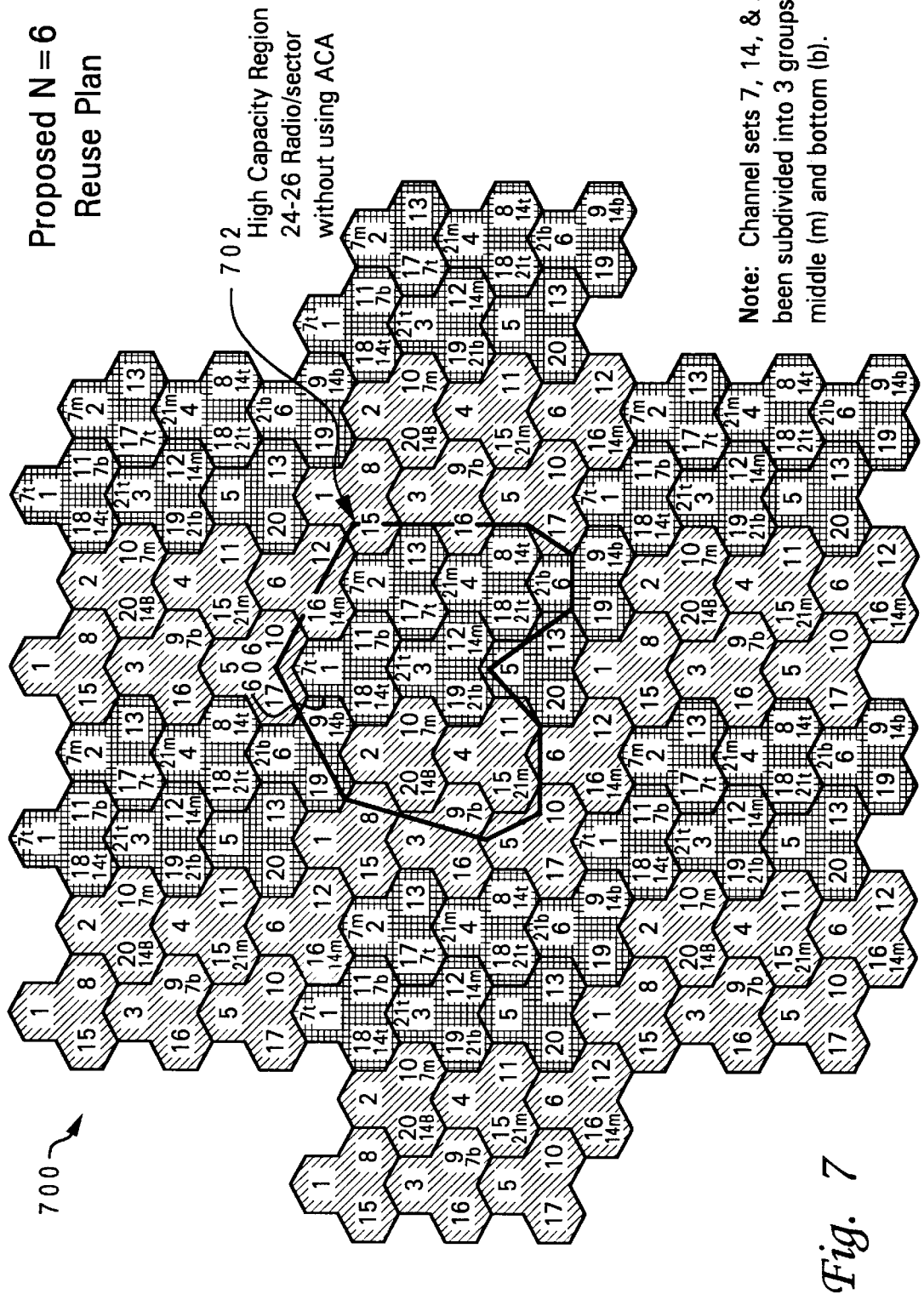
FIG. 7 illustrates a third embodiment of the present invention which makes use of three sub-groupings—t, m, and b—of the reserved channels.

This third embodiment is defined by the three sub-groupings—t, m, and b—of the reserved channels as illustrated in tabular form in table 400 and pictographically in FIG. 7. This third embodiment gives increased flexibility in that it allows the creation of three sub-groupings (it is to be understood that three sub-groupings is merely exemplary, and that more or less could be chosen under the spirit of this embodiment of the present invention) per reserved channel group.

With the sub-grouping so defined, the frequencies within the channel groups can be assigned so as to give maximum separation. For example, returning to the example regarding sectors within cell 606, it was seen that one or more frequencies from channel groups 7 and 14 could be assigned to sectors within cell 606. However, how the frequencies from either or both of channel groups 7 and 14 were to be assigned was not defined. The three sub-groupings t, m, and b of FIG. 4 illustrate one way in which the frequency groups can be assigned for high communications efficiency. An example of such assignment is shown in FIG. 7.

Refer now to FIG. 7. FIG. 7 depicts a cellular grid 700 wherein the sub-groupings t, m, and b of FIG. 4 are used to further define channel group assignments. FIG. 7 also serves to illustrate the repeating pattern of cell clusters 500 and 502 as was discussed above.

High capacity region 702 is a region in the grid where communications density is high. Accordingly, it is desired to attempt to optimize the carrying capacity in this region. This optimization can be achieved by the assignment of channel groups as dictated by FIGS. 4, 5, and 6. However, it is also desired that clarity of communications (which is related, and sometimes identical with carrying capacity) within high capacity region 702 be nearly optimum. Such clarity can be achieved by assigning groups of frequencies from the reserved channel groups as shown in FIG. 7.

It was demonstrated with respect to sectors within cell 606, channels groups 7 and 14 can be used. FIG. 7 shows that near optimum clarity can be achieved by using the sub-grouping t, m, and b of channels 7 and 14. That is, shown is that in cell 606, the subgroups of channels 7 and 14 are assigned to the sectors such that near-optimum frequency separation between the groups is achieved. Thus, shown is that subgroups 7b, 7t, and 14t are assigned to sectors within cell 606. A careful perusal of the cells of grid 700 will show that other subgroups are assigned in like manner for near-optimum channel separation.

It should be noted that by defining sub-groupings of reserved channels, it is possible to "grow" capacity such that there is very little unused capacity in cells. That is, the subgroups are used to grow capacity in the cells such that it is not necessary to completely use all the channels in a reserved group in one sector; rather, such groups can be used piecemeal.

Thus far, FIGS. 4, 5, 6, and 7 have been used to show second and third embodiments of the present invention. FIG.

8 can be used in conjunction with the foregoing to define a fourth embodiment.

Figure 8:
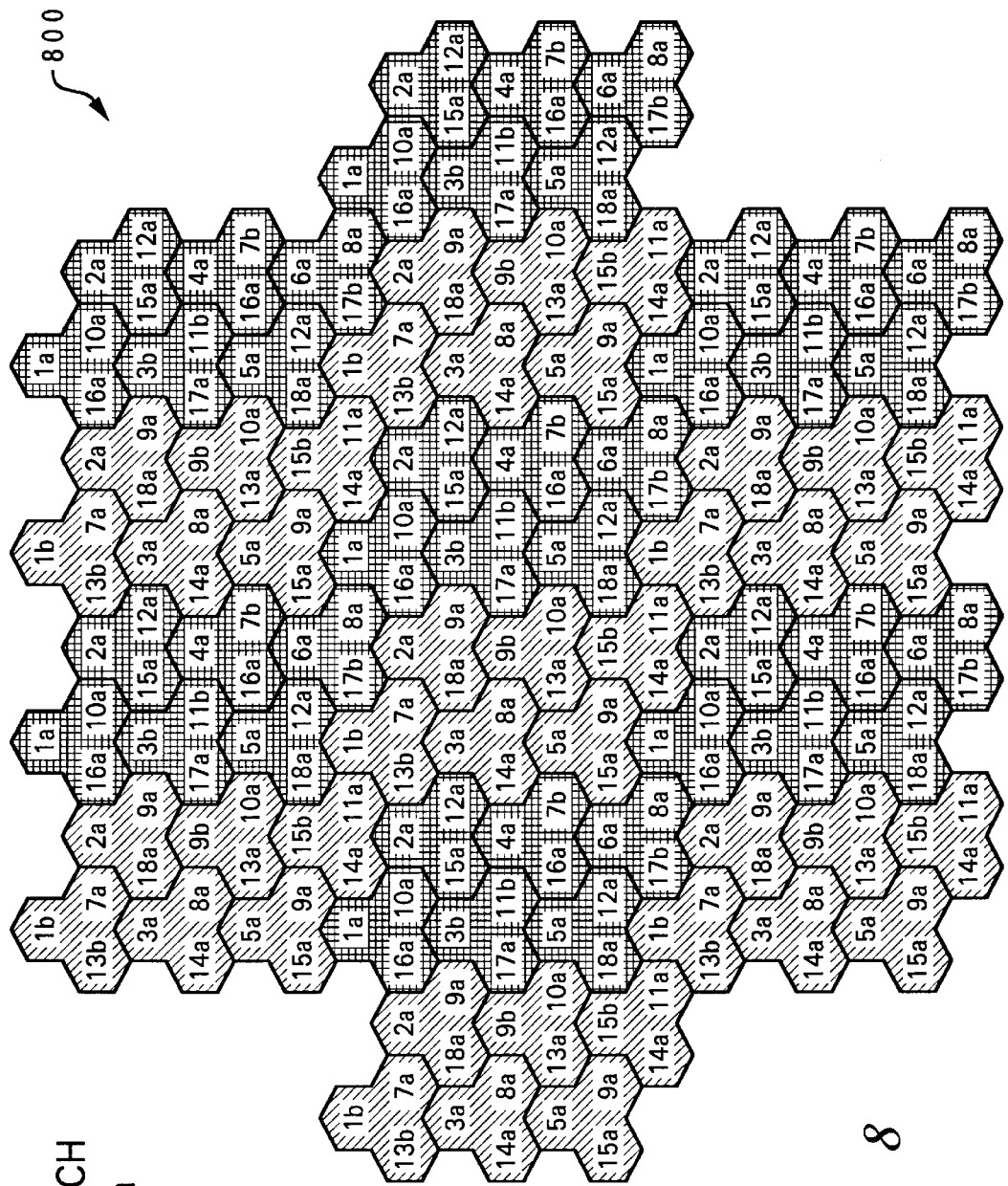
FIG. 8 depicts pictographically a digital control channel (DCCH) frequency reuse plan which constitutes a fourth embodiment of the present invention.

FIG. 8 depicts pictographically a digital control channel (DCCH) frequency reuse plan. Notice that in table 400, in addition to the traffic channel plan previously discussed, 27 channels (i.e., the channels denoted in the first two rows of table 400) were reserved for the DCCH plan. Of these 27 channels, 26 were mapped onto the base N=6 layout. Note that due to adjacent channel interference issues control channel 354 was not used in the proposed plan.

The resulting plan provides an N=8.66 reuse for the control channels as seen in the proposed reuse plan on the next page. This spacing should reduce the risk of co-control channel issues that may occur if the same reuse were used as for the traffic channels. Also note that the control channel numbering was mapped for 18 columns only since no control channels were included with channel sets 7, 14, or 21.

Grid 800 is similar to grid 700, except that shown is the way in which the DCCH frequencies are assigned in a third embodiment of the present invention. Those skilled in the art will appreciate that while the non-DCCH channels can typically stand some error, the DCCH channels are those responsible for controlling the system, and thus they are very error intolerant.

The group assignments shown in FIG. 8 are such that such likelihood of error is nearly minimized. That is, following the channel group assignments as were discussed in FIGS. 4–7, above, the group assignments of FIG. 8 can be utilized to assign the reserved control channels of table 400 such that channel interference among the control channels is held very low while simultaneously maintaining the heightened communications efficiency among the non-DCCH channels in the system.

Figure 9:
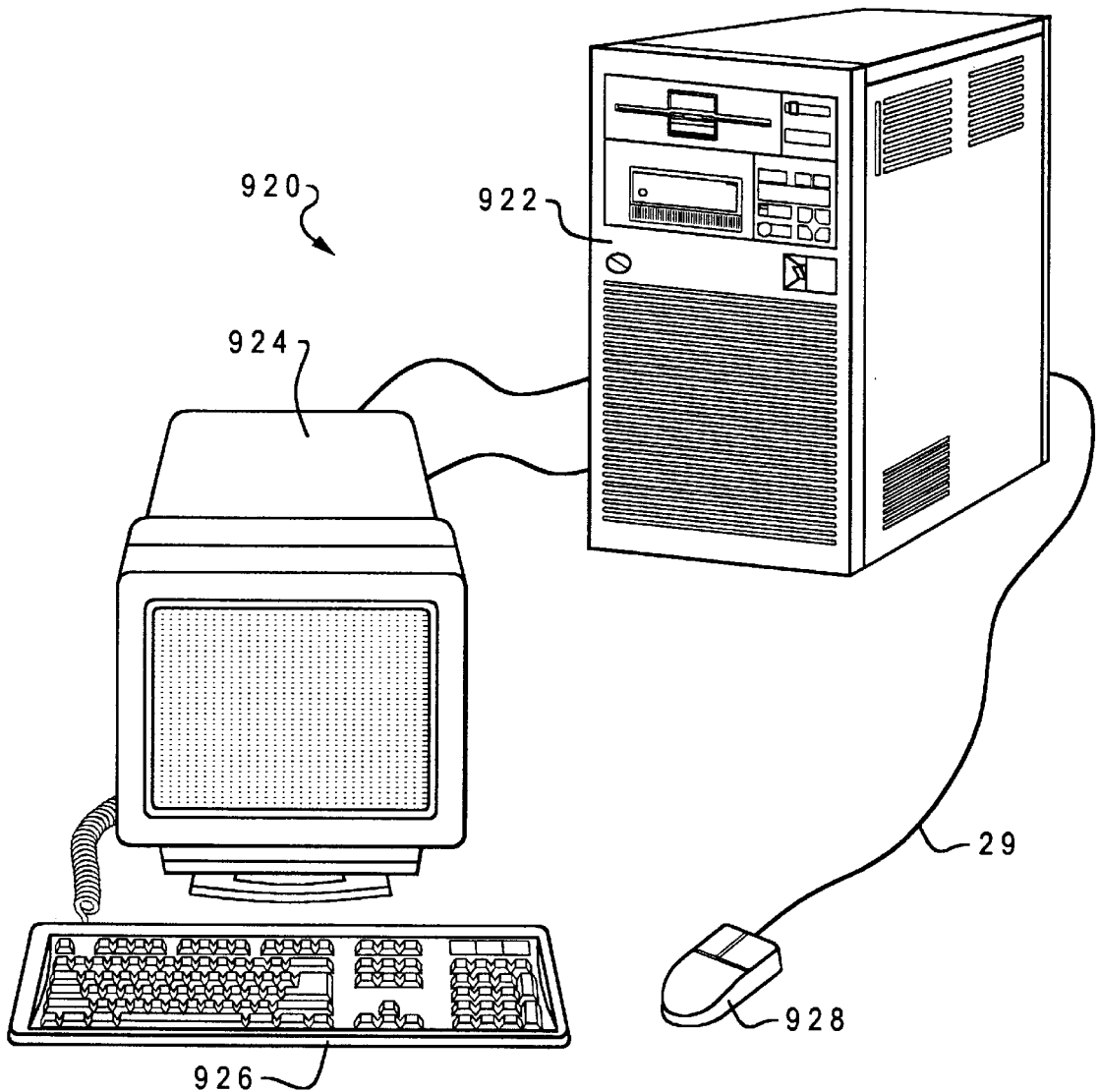
FIG. 9 depicts a pictorial representation of a data-processing system which can be utilized in accordance with the method an system of an illustrative embodiment of the present invention.

With reference now to the figures and in particular with reference now to FIG. 9, there is depicted a pictorial representation of a data-processing system which can be utilized in accordance with the method and system of an illustrative embodiment of the present invention. The method and system provided by an illustrative embodiment of the present invention can be implemented with the data-processing system depicted in FIG. 9. A computer 920 is depicted which includes a system unit 922, a video display terminal 924, a keyboard 926, and a mouse 928. Computer 920 may be implemented utilizing any suitably powerful computer, such as commercially available mainframe computers, minicomputers, or microcomputers.

Figure 10:
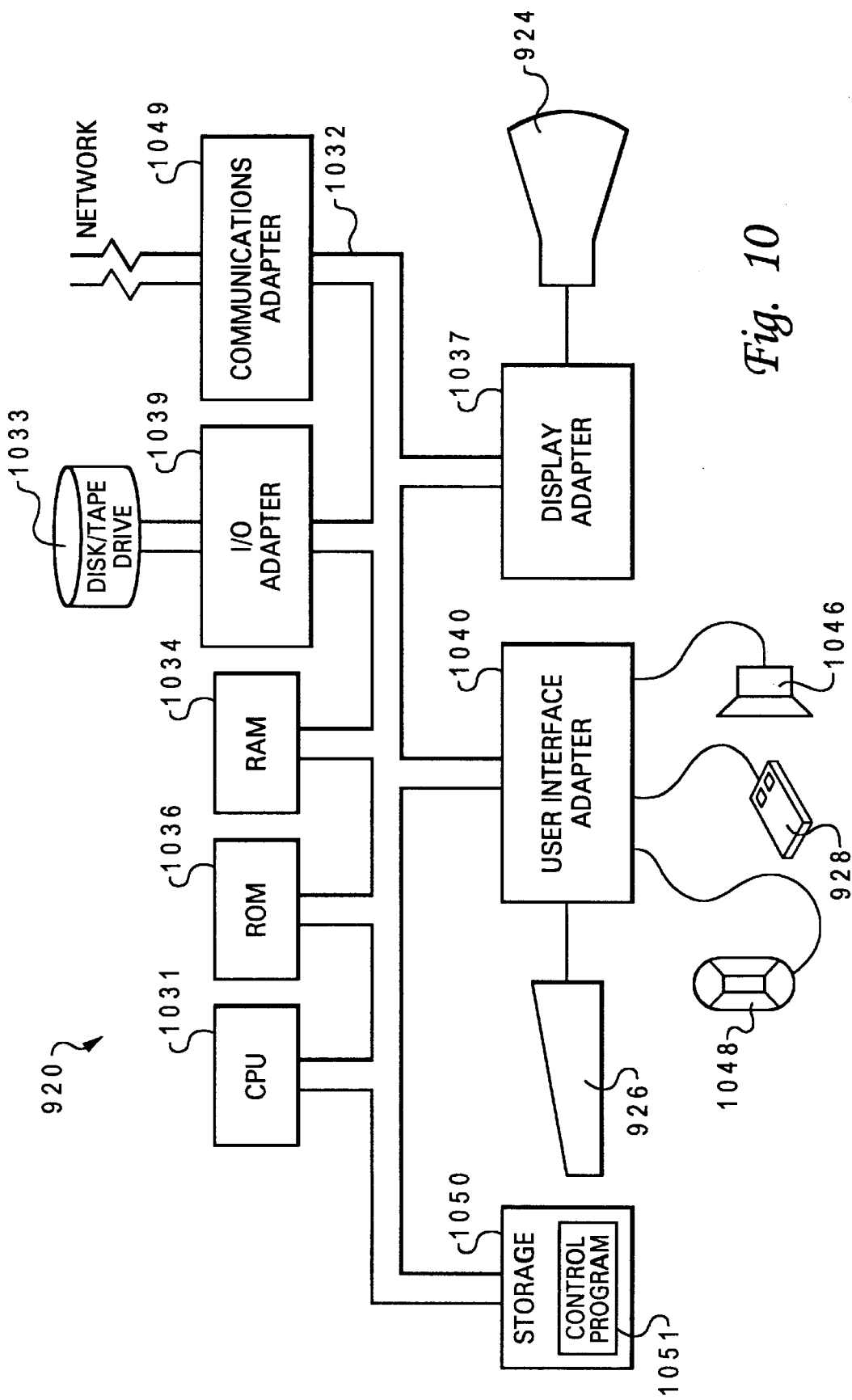
FIG. 10 is an illustration of a representative hardware environment which can be utilized in accordance with the method and system of an illustrative embodiment of the present invention.

FIG. 10 is an illustration of a representative hardware environment which can be utilized in accordance with the method and system of an illustrative embodiment of the present invention. FIG. 10 depicts selected components in computer 920 in which an illustrative embodiment of the present invention may be implemented. System unit 922 includes a Central Processing Unit ("CPU") 1031, such as a conventional microprocessor, and a number of other units interconnected via system bus 1032. Computer 1020 includes random-access memory ("RAM") 1034, read-only memory ("ROM") 1036, display adapter 1037 for connecting system bus 1032 to video display terminal 924, and I/O adapter 1039 for connecting peripheral devices (e.g., disk and tape drives 1033) to system bus 1032. Video display terminal 924 is the visual output of computer 1020, which can be a CRT-based video display well-known in the art of computer hardware. However, with a portable or notebook-based computer, video display terminal 924 can be replaced with an LCD-based or a gas plasma-based flat-panel display. Computer 920 further includes user interface adapter 1040 for connecting keyboard 926, mouse 928, speaker 1046, microphone 1048, and/or other user interface devices, such as a touch screen device (not shown), to system bus 1032. Communications adapter 1049 connects computer 920 to a data-processing network.

Any suitable machine-readable media may retain the method and system of an illustrative embodiment of the present invention, such as RAM 1034, ROM 1036, a magnetic diskette, magnetic tape, or optical disk (the last three being located in disk and tape drives 1033). Any suitable operating system and associated graphical user interface (e.g., Microsoft Windows) may direct CPU 1031. For example, the AIX operating system and AIXwindows windowing system (i.e., graphical user interface) can direct CPU 1031. The AIX operating system is IBM's implementation of the UNIX operating system. UNIX is a trademark of UNIX Systems Laboratories, Inc. The RISC System/6000 system, among others, can run on the AIX operating system. Other technologies can also be utilized in conjunction with CPU 1031, such as touch-screen technology or human voice control. In addition, computer 920 includes a control program 1051 which resides within computer storage 1050. Control program 1051 contains instructions that when executed on CPU 1031 carries out any or all of the operations depicted in the partially schematic diagrams of FIGS. 2, 3, 4, 5, 6, 7, and 8, as described herein, necessary to implement the embodiments.

Those skilled in the art will appreciate that the hardware depicted in FIG. 10 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already depicted.

As a final matter, it is important that while an illustrative embodiment of the present invention has been, and will continue to be, described in the context of a fully functional computing system, those skilled in the art will appreciate that the mechanisms of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A method for channel allocation in a wireless communications system having a plurality of groups of channels, said method comprising the steps of:

mapping a geographic area with a high bandwidth cell cluster, wherein each cell in said high bandwidth cell cluster is comprised of a plurality of sectors;

reserving at least one channel group from said plurality of groups of channels to provide at least one reserved channel group and at least one non-reserved channel group; and selectively assigning a channel group from said plurality of groups of channels to each cell within said high bandwidth cell cluster by first assigning a channel group from among said at least one non-reserved channel group to each cell of said high bandwidth cell cluster and then assigning a channel group from among said at least one reserved channel group to pairs of adjacent cells among said high bandwidth cell cluster is in which channel group adjacencies exists, wherein said channel group adjacencies are substantially eliminated and high bandwidth is maintained.

2. The method of claim 1, wherein said step of mapping further includes the steps of:

defining a first basic cell cluster within which frequency groups are to be mapped;

defining a second basic cell cluster within which frequency groups are to be mapped; and mapping the defined geographic area with the first and second basic cell clusters.

3. The method of claim 2, wherein said step of selectively assigning channels, further includes the steps of:

obtaining a frequency reuse table having a plurality of channel groups available for allocation to said first basic cell cluster and said second basic cell cluster, wherein said frequency reuse table further includes additional channel groups which are utilized for said at least one reserved channel group; and assigning the plurality of channel groups to the first basic cell cluster and the second basic cell cluster.

4. The method of claim 1, wherein said high bandwidth cell cluster comprises a first high bandwidth cell cluster and said method further comprises the steps of:

obtaining a frequency reuse table having a plurality of channel groups wherein a first channel group is selectable as said at least one non-reserved channel group and a second channel group is selectable as said at least one reserved channel group;

determining a number of cells in said first high bandwidth cell cluster for which said frequency reuse table was generated;

mapping said geographic area with a second high bandwidth cell cluster adjacent to said high bandwidth cell cluster; and assigning said unreserved channels and said reserved channels to both said first high bandwidth cell cluster and said second high bandwidth cell cluster, wherein channels are assigned in a manner which substantially maximizes spacing between adjacent channels in cells of both said first high bandwidth cell cluster and said second high bandwidth cell cluster.

5. The method of claim 4, further comprising the steps of:

subdividing the at least one reserved channel group into at least two subgroups; and assigning the at least two subgroups to separate sectors within at least one cell among the first high bandwidth cell cluster and the second high bandwidth cell cluster such that channels of the at least one reserved channel group are spread among different sectors to substantially maximize separation of said channels within a cell and within adjacent cells.

6. The method of claim 4, further comprising the steps of:

reserving at least one channel for control information; and assigning the at least one control channel such that interference on the control channel is substantially minimized.

7. The method of claim 1, further comprising the steps of:

reserving at least one channel for control information; and assigning the at least one control channel such that interference on the control channel is substantially minimized.

8. A system for channel allocation in a wireless communications system having a plurality of groups of channels, and wherein said system assigns specific groups of channels such that channel interference is minimized, said system comprising:

means for mapping a geographic area with at least one high bandwidth cell cluster, wherein each cell in said high bandwidth cell cluster is comprised of a plurality of sectors;

means for reserving at least one channel group from said plurality of groups of channels to provide at least one reserved channel group and at least one non-reserved channel group; and means for selectively assigning a channel group from said plurality of groups of channels to each cell within said high bandwidth cell cluster by first assigning a channel group from among said at least one non-reserved channel group to each cell of said high bandwidth cell cluster and then assigning a channel group from among said at least one reserved channel group to pairs of adjacent cells among said high bandwidth cell cluster in which channel group adjacencies exists, wherein said channel group adjacencies are substantially eliminated and high bandwidth is maintained.

9. The system of claim 8, wherein said means for mapping further includes:

means for defining a first basic cell cluster within which frequency groups are to be mapped;

means for defining a second basic cell cluster within which frequency groups are to be mapped; and means for mapping the defining geographic area with the first and second basic cell clusters.

10. The system of claim 9, wherein said means for selectively assigning channels, further includes:

means for obtaining a frequency reuse table having a plurality of channel groups available for allocation to said first basic cell cluster and said second basic cell cluster, wherein said frequency reuse table further includes additional channel groups which are utilized for said at least one reserved channel group; and means for assigning the plurality of channel groups to the first basic cell cluster and the second basic cell cluster.

11. The system of claim 8, wherein said high bandwidth cell cluster comprises a first high bandwidth cell cluster and said system further comprises:

means for obtaining a frequency reuse table having a plurality of channel groups, wherein a first channel group is selectable as said at least one non-reserved channel group and a second channel group is selectable as said at least one reserved channel group;

means for mapping said geographic area with a second high bandwidth cell cluster adjacent to said high bandwidth cell cluster; and means for assigning said unreserved channels and said reserved channels to both said first high bandwidth cell cluster and said second high bandwidth cell cluster, wherein channels are assigned in a manner which substantially maximizes spacing between adjacent channels in cells of both said first high bandwidth cell cluster and said second high bandwidth cell cluster.

12. The system of claim 11, further including:

means for subdividing the at least one reserved channel group into at least two subgroups; and means for assigning the at least two subgroups to separate sectors within at least one cell among the first high bandwidth cell cluster and the second high bandwidth cell cluster such that channels of the at least one reserved channel group are spread among different sectors to substantially maximize separation of said channels within a cell and within adjacent cells.

13. The system of claim 11, further comprising:

means for reserving at least one channel for control information; and means for assigning the at least one control channel such that interference on the control channel is substantially minimized.

14. The system of claim 8, further comprising:

means for reserving at least one channel for control information; and means for assigning the at least one control channel such that interference on the control channel is substantially minimized.

15. The method of claim 1, further comprising the steps of:

determining when said channel group adjacencies exist among said pairs of adjacent cells, said pairs comprising a first cell and a second cell;

in response to said determining step, assigning said channel group from said at least one reserved channel group to a sector of said first cell, wherein said sector is directly adjacent to a next sector of said second cell, wherein channel group adjacencies are substantially eliminated in directly adjacent sectors of said pairs of adjacent cells.

16. The method of claim 1, further comprising the step of empirically determining an allocation scheme for channels within said at least one reserved channel group, wherein said allocation scheme substantially removes all channel adjacencies in adjacent cells and adjacent sectors when said channels of said at least one non-reserved channel group are assigned to said cell cluster.

17. The method of claim 5, said method implemented within a data processing system as a program product on a computer readable medium and further comprising the step of:

outputting an allocation scheme including an allocation of channels from both non-reserved and reserved channel groups and said at least one control channel, said allocation scheme providing said substantial separation between channels within each of said high bandwidth cell clusters and within said plurality of cell clusters.

18. The system of claim 8, further comprising:

means for determining when said channel group adjacencies exist among said pairs of adjacent cells, said pairs comprising a first cell and a second cell;

means, in response to said determining means, for assigning said channel group from said at least one reserved channel group to a sector of said first cell, wherein said sector is directly adjacent to a next sector of said second cell, wherein channel group adjacencies are substantially eliminated in directly adjacent sectors of said pairs of adjacent cells.

19. The system of claim 8, further comprising means for empirically determining an allocation scheme for channels within said at least one reserved channel group, wherein said allocation scheme substantially removes all channel adjacencies in adjacent cells and adjacent sectors when said channels of said at least one non-reserved channel group are assigned to said cell cluster.

* * * * *